(12) United States Patent
Watson et al.

(10) Patent No.: US 8,536,996 B2
(45) Date of Patent: Sep. 17, 2013

(54) VEHICLE INFORMATION DISPLAY AND METHOD

(75) Inventors: David Watson, Ann Arbor, MI (US);
Angela L. Watson, Ann Arbor, MI (US);
Sohel Merchant, Canton, MI (US);
Craig Sandvig, Sterling Heights, MI (US); Ivette Hernandez, Westland, MI (US); Steven Bishop, Mountain View, CA (US); Engin Erdogan, San Francisco, CA (US); Altay Jun Wakui Sendil, Pacifica, CA (US); Susanne Stage, San Francisco, CA (US); Ryan J. Skaff, Farmington Hills, MI (US); Derek Hartl, Royal Oak, MI (US); James Belloli, Clinton Township, MI (US); Jeffrey Greenberg, Ann Arbor, MI (US); Michael Blommer, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/483,523

(22) Filed: May 30, 2012

(65) Prior Publication Data
US 2012/0235806 A1  Sep. 20, 2012

Related U.S. Application Data

(63) Continuation of application No. 12/259,474, filed on Oct. 28, 2008, now Pat. No. 8,207,841.

(51) Int. Cl.
*B60Q 1/00* (2006.01)

(52) U.S. Cl.
USPC ........... 340/462; 340/438; 340/439; 340/450; 340/450.1; 340/450.2; 340/450.3; 340/451; 340/452; 340/459; 340/461

(58) Field of Classification Search
None
See application file for complete search history.

(56) References Cited

U.S. PATENT DOCUMENTS

| 3,949,356 A | 4/1976 | Fuzzell et al. |
| 4,072,924 A | 2/1978 | Pomerantz |

(Continued)

FOREIGN PATENT DOCUMENTS

| DE | 2064025 | 7/1972 |
| DE | 3028867 A1 | 2/1982 |

(Continued)

OTHER PUBLICATIONS

Nystrom et al., Data Management Issues in Vehicle Control Systems: a Case Study, IEEE, 2002, pp. 1-8.

(Continued)

*Primary Examiner* — Julie Lieu
(74) *Attorney, Agent, or Firm* — Jennifer M. Stec; Brooks Kushman P.C.

(57) ABSTRACT

An information display system for a vehicle includes an information display for displaying a plurality of selectable information display levels according to an information display hierarchy. Each selectable information display level may include one or more visual gauges for conveying vehicle information. Each successive selectable information display level may include additional and/or alternative vehicle information when compared to the preceding selectable information display level. The information display system further includes a controller configured to display the plurality of selectable information display levels according to an at least one driver input. In this way, the information display can display a particular selectable information display level best suited to a driver's individual preferences or understanding of the vehicle's operations.

20 Claims, 11 Drawing Sheets

(56) References Cited

U.S. PATENT DOCUMENTS

| | | | |
|---|---|---|---|
| 4,787,040 A | 11/1988 | Ames et al. | |
| 4,890,088 A | 12/1989 | Woodell | |
| 4,908,611 A | 3/1990 | Iino | |
| 5,006,829 A | 4/1991 | Miyamoto et al. | |
| 5,017,916 A * | 5/1991 | Londt et al. | 340/870.13 |
| 5,121,112 A | 6/1992 | Nakadozono | |
| 5,327,117 A | 7/1994 | Kohsaka | |
| 5,404,443 A | 4/1995 | Hirata | |
| 5,566,774 A | 10/1996 | Yoshida | |
| 5,757,268 A | 5/1998 | Toffolo et al. | |
| 5,823,280 A | 10/1998 | Lateur et al. | |
| 5,847,704 A | 12/1998 | Hartman | |
| 5,857,159 A | 1/1999 | Dickrell et al. | |
| 5,880,710 A | 3/1999 | Jaberi et al. | |
| 6,055,468 A | 4/2000 | Kaman et al. | |
| 6,092,021 A | 7/2000 | Ehlbeck et al. | |
| 6,114,775 A | 9/2000 | Chung et al. | |
| 6,223,103 B1 | 4/2001 | Patil | |
| 6,289,332 B2 | 9/2001 | Menig et al. | |
| 6,356,812 B1 | 3/2002 | Cragun | |
| 6,404,332 B1 | 6/2002 | Wakashiro et al. | |
| 6,411,888 B1 | 6/2002 | Weisman, II | |
| 6,480,106 B1 | 11/2002 | Crombez et al. | |
| 6,581,707 B2 | 6/2003 | Morimoto et al. | |
| 6,600,413 B1 | 7/2003 | Lo | |
| 6,748,755 B2 | 6/2004 | Kubo et al. | |
| 6,751,534 B2 | 6/2004 | Robichaux et al. | |
| 6,998,976 B2 * | 2/2006 | Kawai et al. | 340/461 |
| 7,024,306 B2 | 4/2006 | Minami et al. | |
| 7,091,839 B2 | 8/2006 | Situ et al. | |
| 2002/0157881 A1 | 10/2002 | Bakholdin et al. | |
| 2002/0171627 A1* | 11/2002 | Noguchi et al. | 345/156 |
| 2003/0230443 A1 | 12/2003 | Cramer et al. | |
| 2004/0020695 A1 | 2/2004 | Potter | |
| 2005/0113988 A1 | 5/2005 | Nasr et al. | |
| 2005/0128065 A1 | 6/2005 | Kolpasky et al. | |
| 2005/0278079 A1 | 12/2005 | Maguire | |
| 2006/0185917 A1 | 8/2006 | Ozeki et al. | |
| 2007/0208468 A1 | 9/2007 | Sankaran et al. | |
| 2008/0042821 A1* | 2/2008 | Kaya | 340/459 |
| 2009/0086014 A1* | 4/2009 | Lea et al. | 348/25 |
| 2009/0086199 A1* | 4/2009 | Troy et al. | 356/251 |

FOREIGN PATENT DOCUMENTS

| | | |
|---|---|---|
| DE | 3326972 A1 | 2/1985 |
| DE | 3521363 A1 | 1/1986 |
| DE | 4401231 A1 | 7/1995 |
| DE | 19705452 A1 | 8/1996 |
| DE | 19941953 A1 | 3/2001 |
| DE | 10249765 A1 | 5/2004 |
| DE | 102005027474 A1 | 1/2006 |
| DE | 102006008064 A1 | 8/2006 |
| EP | 0663311 A1 | 7/1995 |
| EP | 0829635 A2 | 3/1998 |
| EP | 1234705 A2 | 8/2002 |
| EP | 0875730 B1 | 7/2003 |
| EP | 1342605 A1 | 9/2003 |
| FR | 1035163 | 8/1953 |
| GB | 2266375 A | 10/1993 |
| JP | 58063696 U | 4/1983 |
| JP | 7315078 A2 | 12/1995 |
| JP | 010129298 A | 5/1998 |
| JP | 10214172 A | 8/1998 |
| JP | 2921661 B2 | 7/1999 |
| JP | 11208313 A | 8/1999 |
| JP | 11220803 A | 8/1999 |
| JP | 11220807 A | 8/1999 |
| JP | 11220808 A | 8/1999 |
| JP | 3092494 B2 | 9/2000 |
| JP | 2000247164 A | 9/2000 |
| JP | 2001109459 A | 4/2001 |
| JP | 2001119802 A | 4/2001 |
| JP | 3612697 B2 | 1/2005 |
| JP | 2005067406 A | 3/2005 |
| JP | 2005205984 A | 8/2005 |
| JP | 2006220482 A2 | 8/2006 |
| JP | 2006290182 A | 10/2006 |
| JP | 2007078699 A | 3/2007 |
| JP | 2007118641 A | 5/2007 |
| JP | 2007125921 A | 5/2007 |
| JP | 2007153252 A | 6/2007 |
| JP | 2007274806 A | 10/2007 |
| JP | 2008002456 A | 1/2008 |
| JP | 2008056058 A | 3/2008 |
| KR | 20030046635 A | 6/2003 |
| WO | 2006001809 A1 | 1/2006 |
| WO | 2006085193 A1 | 8/2006 |

OTHER PUBLICATIONS

U.S. Department of Transportation Federal Highway Administration, In-Vehicle Display Icons and Other Information Elements, Preliminary Assessment of Visual Symbols, Publication No. FHWA-RD-99-196, Dec. 1999, 100 pages.

Gary E. Burnett et al., Ubiquitous Computing Within Ars: Designing Controls for Non-Visual Use, Academic Press, 2001, pp. 1-11.

Search Report, dated Jan. 7, 2013, for the corresponding German patent application SN DE102009046010.1, including concise explanation of relevance for non-English language information.

* cited by examiner

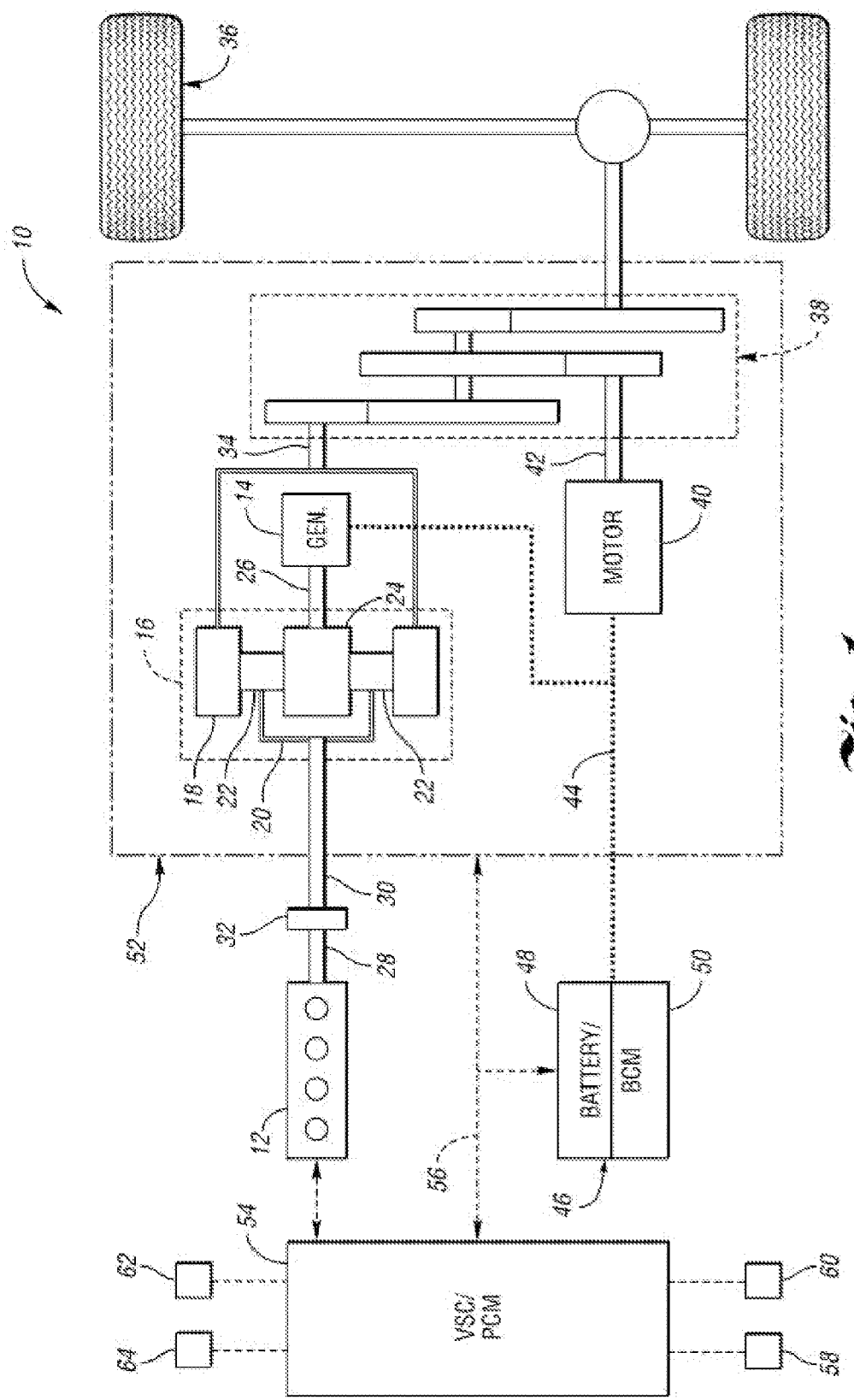

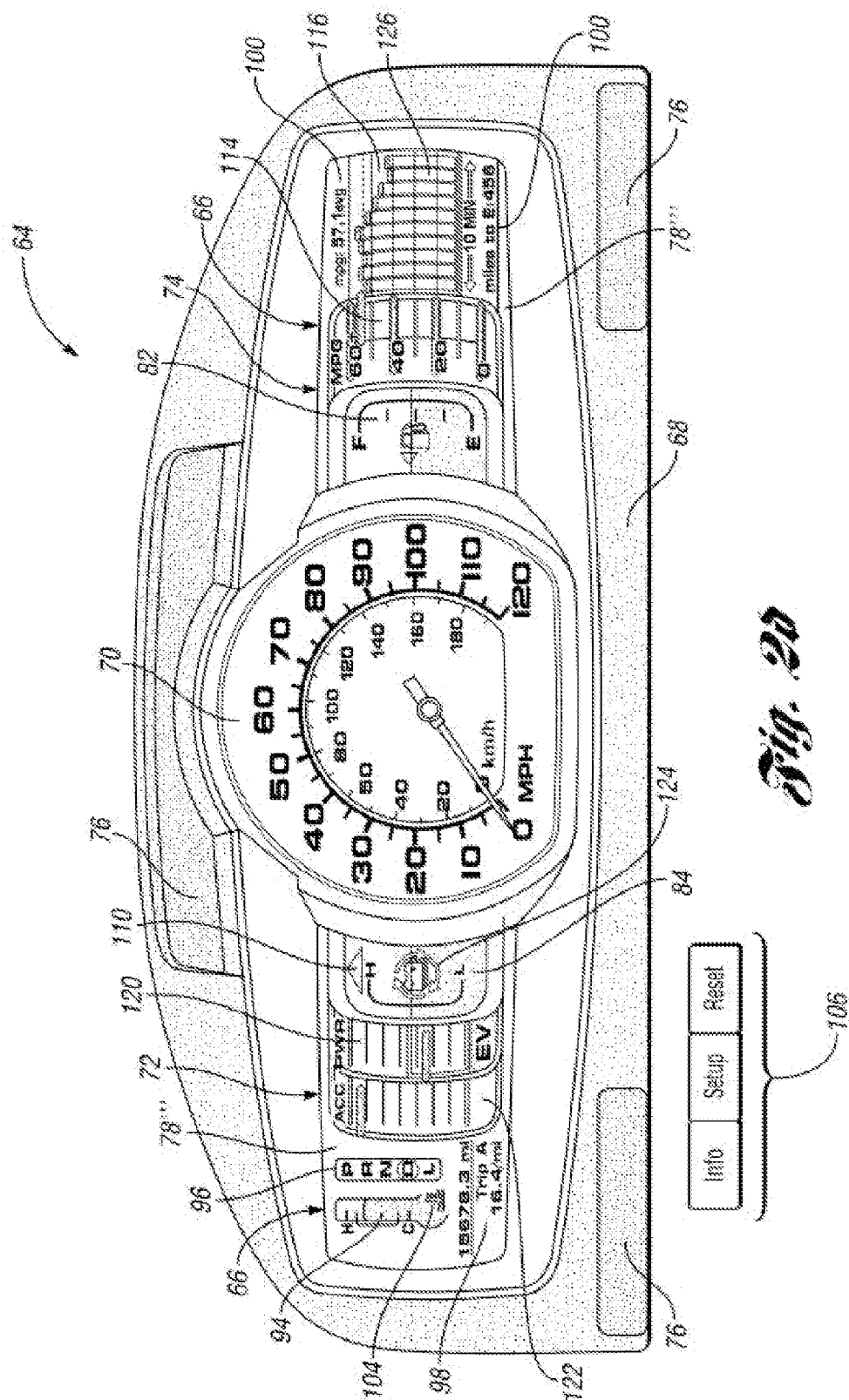

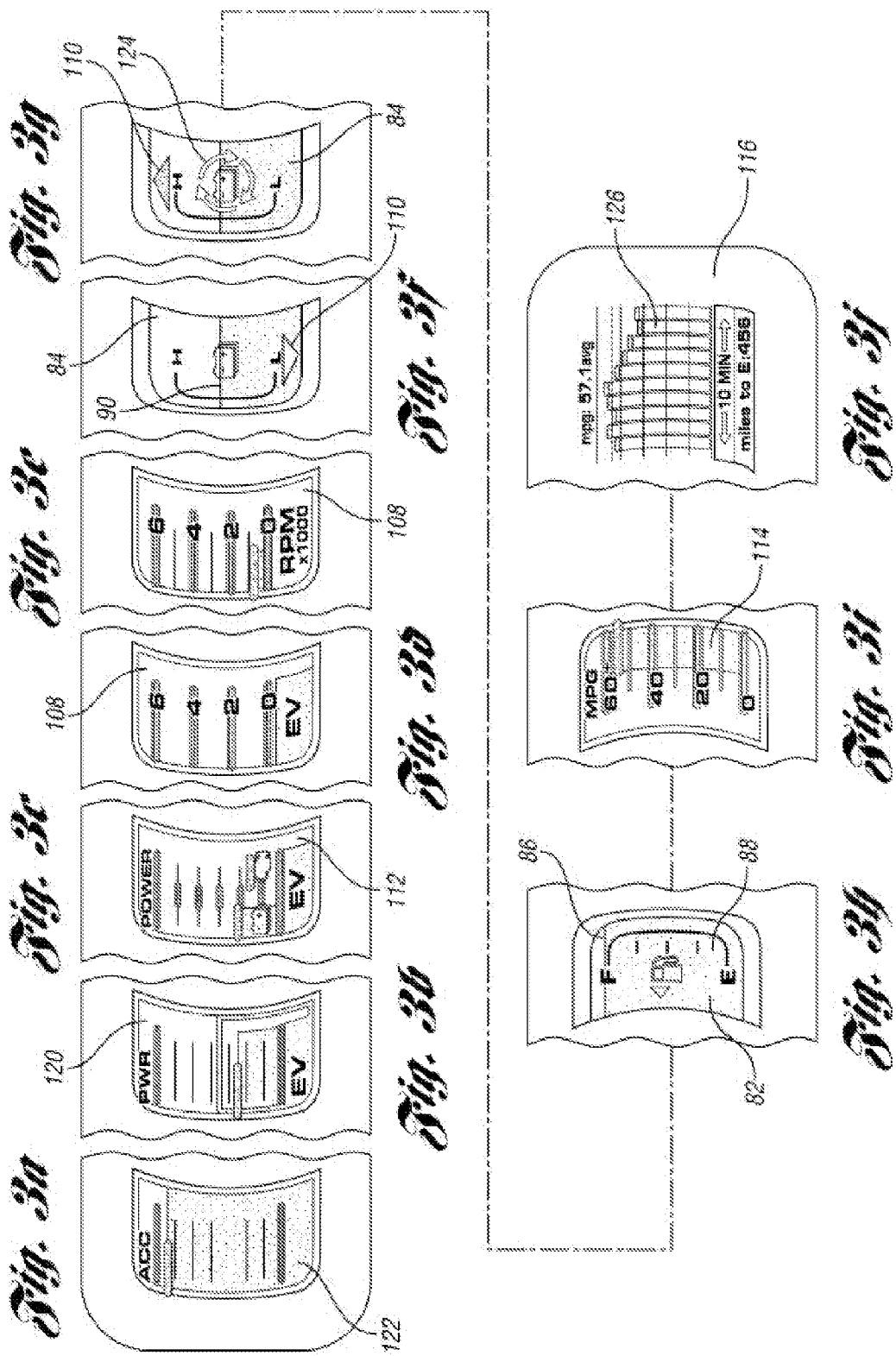

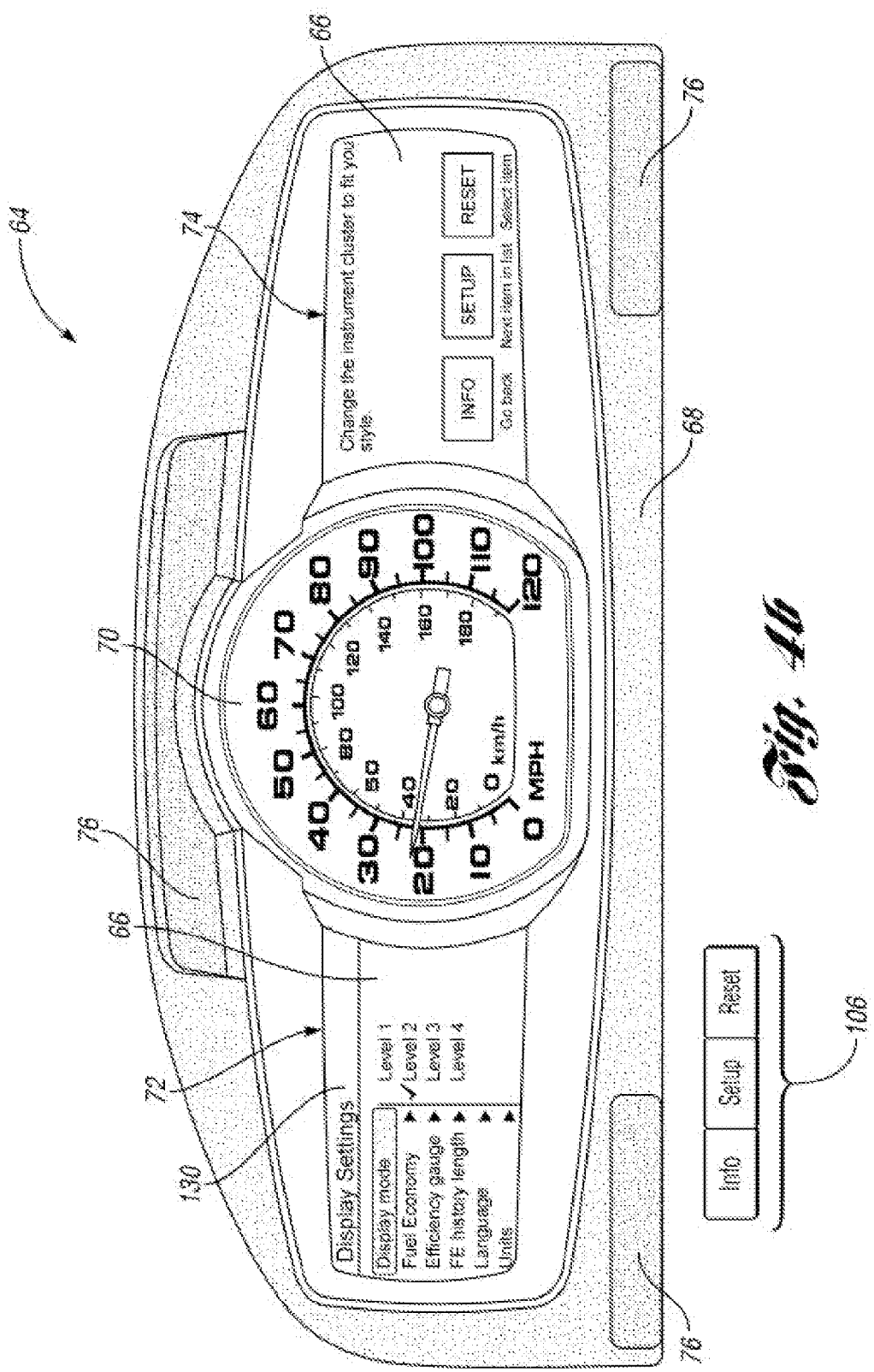

VEHICLE INFORMATION DISPLAY AND METHOD

CROSS-REFERENCE TO RELATED APPLICATIONS

This application is a continuation of U.S. application Ser. No. 12/259,474, filed Oct. 28, 2008, now U.S. Pat. No. 8,207,841.

TECHNICAL FIELD

The following relates to a hierarchical information display system and method for a vehicle for displaying vehicle information including an information display configured to display at least one of a plurality of selectable information display levels.

BRIEF DESCRIPTION OF THE DRAWINGS

FIG. 1 is a simplified, exemplary schematic representation of a hybrid electric vehicle including a hierarchical information display system according to an embodiment of the present application;

FIG. 2d is a simplified, exemplary diagram depicting the information display system displaying a fourth selectable information display level;

FIG. 3a is a simplified, exemplary diagram depicting an accessory load gauge according to an embodiment of the present application;

FIG. 3b is a simplified, exemplary diagram depicting a vehicle power gauge according to an embodiment of the present application;

FIG. 3c is a simplified, exemplary diagram depicting a split power gauge according to an embodiment of the present application;

FIG. 3d is a simplified, exemplary diagram depicting an electrical vehicle (EV) mode gauge according to an embodiment of the present application;

FIG. 3e is a simplified, exemplary diagram depicting a tachometer according to an embodiment of the present application;

FIG. 3f is a simplified, exemplary diagram depicting a battery state of charge gauge according to an embodiment of the present application;

FIG. 3g is a simplified, exemplary diagram depicting a battery state of charge gauge according to an alternate embodiment of the present application;

FIG. 3h is a simplified, exemplary diagram depicting a fuel level gauge according to an embodiment of the present application;

FIG. 3i is a simplified, exemplary diagram depicting an instantaneous fuel economy gauge according to an embodiment of the present application;

FIG. 3j is a simplified, exemplary diagram depicting an efficiency gauge according to an embodiment of the present application;

FIG. 4b is a simplified, exemplary diagram depicting the information display system displaying a display settings menu according to an embodiment of the present application;

DETAILED DESCRIPTION

Figure 2A:
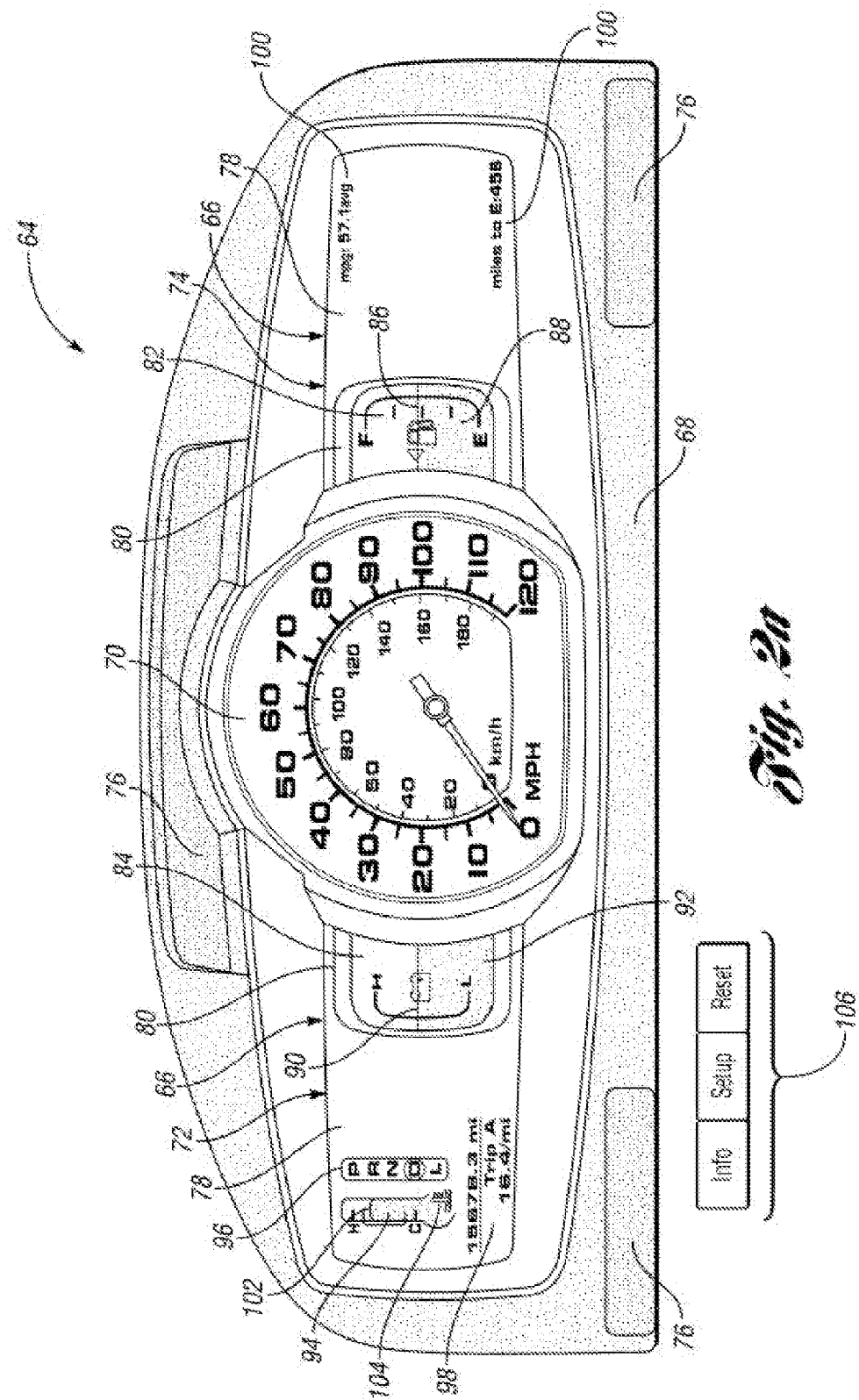
FIG. 2a is simplified, exemplary diagram depicting an information display system displaying a first selectable information display level according to an embodiment of the present application.

With reference to FIGS. 1-7, a more detailed description of embodiments of the system and method and various components thereof will now be provided.

All vehicles, whether passenger or commercial, include a number of gauges, indicators, and various other displays to provide the vehicle operator with information regarding the vehicle and its surroundings. With the advent of new technologies, such as hybrid electric vehicles (HEVs), has come a variety of new gauges and information displays that help drivers to better learn the operation of these vehicles that utilize new technology. For example, many HEVs incorporate gauges that attempt to provide the driver with information on the various hybrid driving states. For example, some gauges will indicate to the driver when the vehicle is being propelled by the engine alone, the motor alone, or a combination of the two. Similarly, a display may indicate when the motor is operating as a generator, and is recharging an energy storage device, such as a battery.

With regard to HEVs, it is known that some drivers may not be able to achieve desired fuel economy numbers, in part because of driving habits. In many cases, drivers are willing to modify their behavior, but are unable to translate recommended techniques into real changes in their driving habits. Moreover, gauges or displays that merely indicate when the engine is on or off, provide information that is not timely—i.e., once the indicator signals that the engine is on, it is too late for the driver to modify his or her driving to keep the engine off.

With the advent of sensing electronics, computers and other vehicle related technology, the amount of vehicle information that can be communicated to the driver is virtually limitless. Often, the driver may not even know of all the features and capabilities their vehicles have to offer. Displaying certain types of information, particularly information relevant to HEVs, can help facilitate economical driving choices by a driver.

However, there is often a learning curve associated with the various informative content available to a driver. This learning curve may be exacerbated as drivers are introduced to more advanced vehicle technologies, capabilities and features, particularly with respect to HEVs. Displaying much of the vehicle information available to a driver can be overwhelming, particularly information designed to influence driving habits. Moreover, many drivers may not want to have an extensive amount of the available vehicle information communicated to them. Rather, for some drivers, less is more.

Therefore, a need exists for an information display for a vehicle, and a method for displaying such information, that provides content that will help a driver increase fuel economy and other energy efficiencies while offering a driver choices relating to the amount and type of content to be displayed through a plurality of selectable information display levels arranged hierarchically.

Referring now to the drawings, FIG. 1 is a simplified, exemplary schematic representation of a vehicle 10, which includes an engine 12 and an electric machine, or generator 14. The engine 12 and the generator 14 are connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also output torque to a shaft 26 connected to the sun gear 24. Similarly, the engine 12 outputs torque to a crankshaft 28, which is connected to a shaft 30 through a passive clutch 32. The clutch 32 provides protection against over-torque conditions. The shaft 30 is connected to the carrier 20 of the planetary gear arrangement 16, and the ring gear 18 is connected to a shaft 34, which is connected to a first set of vehicle drive wheels, or primary drive wheels 36, through a gear set 38.

The vehicle 10 includes a second electric machine, or motor 40, which can be used to output torque to a shaft 42 connected to the gear set 38. Other vehicles within the scope of the present application may have different electric machine arrangements, such as more or fewer than two electric machines. In the embodiment shown in FIG. 1, the electric machine arrangement—i.e., the motor 40 and the generator 14—can both be used as motors to output torque. Alternatively, each can also be used as a generator, outputting electrical power to a high voltage bus 44 and to an energy storage system 46, which includes a battery 48 and a battery control module (BCM) 50.

The battery 48 is a high voltage battery that is capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52—i.e., the generator 14 and motor 40—a vehicle control system, shown generally as controller 54, is provided. As shown in FIG. 1, the controller 54 is a vehicle system controller/powertrain control module (VSC/PCM). Although it is shown as a single controller, it may include multiple controllers. For example, the PCM portion of the VSC/PCM 54 may be software embedded within the VSC/PCM 54, or it can be a separate hardware device.

A controller area network (CAN) 56 allows the VSC/PCM 54 to communicate with the transmission 52 and the BCM 50. Just as the battery 48 includes a BCM 50, other devices controlled by the VSC/PCM 54 may have their own controllers. For example, an engine control unit (ECU) may communicate with the VSC/PCM 54 and may perform control functions on the engine 12. In addition, the transmission 52 may include a transmission control module (TCM), configured to coordinate control of specific components within the transmission 52, such as the generator 14 and/or the motor 40.

Some or all of these various controllers can make up a control system in accordance with the present application. Although illustrated and described in the context of the vehicle 10, which is an HEV, it is understood that embodiments of the present application may be implemented on other types of vehicles, such as those powered by an engine or electronic motor alone.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. The braking system 58 may also include a regenerative braking system, wherein braking energy is captured and stored as electrical energy in the battery 48. Similarly, the accelerator pedal 60 may include one or more sensors, which, like the sensors in the braking system 58, communicate with the controller 54.

The air conditioning system 62 also communicates with the controller 54. The on/off status of the air conditioning system can be communicated to the controller 54, and can be based on, for example, the status of an operator actuated switch, or the automatic control of the air conditioning system 62 based on related functions such as window defrost. In addition to the foregoing, the vehicle 10 includes a hierarchical information display system 64, which, as explained in detail below, provides vehicle content to an operator of the vehicle 10.

FIGS. 2a-2d show the information display system 64 in greater detail. The information display system 64 includes an information display 66 disposed within an instrument panel 68 of the vehicle 10. The information display 66 may be a liquid crystal display (LCD), a plasma display, an organic light emitting display (OLED), or any other suitable display. The information display system 64 may further include an analog or digital speedometer 70. In this regard, the information display 66 may be divided into two portions, a left display portion 72 and a right display portion 74, and the speedometer 70 may be centrally disposed between the two display portions. Alternatively, the speedometer 70 may be part of the information display 66.

In addition to the information display 66 and the speedometer 70, the information display system 64 may further include one or more signaling portions 76 embedded in the instrument panel 68. The one or more signaling portions 76 generally comprise an assortment of telltales, warning lights or indicators. Each telltale, warning light or indicator may illuminate, via an arrangement of light emitting diodes (LEDs), in response to a signal from the controller 54. For example, the one or more signaling portions 76 may include a left turn signal indicator and a right turn signal indicator (not shown) that illuminate continuously or repeatedly upon the activation of a turn signal. As another example, the one or more signaling portions 76 may include a telltale indicating that the tire pressure monitoring system (TPMS) needs servicing.

In accordance with an embodiment of the present application, the information display 66 can provide a plurality of selectable information display levels 78. Each selectable information display level 78 may include one or more visual gauges 80 for conveying vehicle content to a driver. The information display 66 can be configured to display only one selectable information display level 78 at a time. The plurality of selectable information display levels 78 can be arranged hierarchically with varying levels of vehicle content. To this end, each successive selectable information display level 78 may provide an increasing amount of vehicle content or additional content detail than that of a preceding information display level. The hierarchically arranged information display system 64 can provide an information display with sufficient flexibility to meet the preferences of a wide range of drivers.

Accordingly, FIGS. 2a-2d depict exemplary embodiments of the plurality of selectable information display levels 78 illustrating how varying levels of vehicle content can be communicated in a hierarchical fashion. Each of four exemplary selectable information display levels 78 will be described in greater detail below. However, it is to be understood that less than or more than four selectable information display levels 78 may be employed without departing from the scope of the present application. Moreover, it is to be understood that the content, type and quantity of vehicle information conveyed in each selectable information display level 78 may vary without departing from the scope of the present application.

Referring specifically to FIG. 2a, the information display 66 presents a first selectable information display level 78 (Level 1) that may provide a simple, basic level of content conveying relatively minimal feedback information to the driver. Correspondingly, the first selectable information display level 78 of FIG. 2a may include a fuel level gauge 82 and a battery state of charge gauge 84. The fuel level gauge 82 may include an indicator arrangement for informing the driver of the amount of fuel remaining in a fuel tank. The indicator arrangement of the fuel level gauge 82 may include a fuel level line 86 representing the quantity of fuel remaining. The area 88 below the fuel level line 86 may be semi-transparently shaded for further conveying the quantity of fuel remaining in the fuel tank. For example, the area 88 below the fuel level line 86 may be shown in a particular color such as a shade of green or orange.

According to an embodiment of the present application, once the fuel level line 86 reaches a particular predetermined fuel level, the area 88 underneath the fuel level line 86 may change colors or shades. For example, when the fuel level reaches 1/16 of a fuel tank or less, the area 88 underneath the fuel level line 86 may turn a shade of semi-transparent yellow. Further, when the fuel level line 86 reaches empty or nearly empty, the area 88 below the fuel level line 86 may turn to a shade of red.

The battery state of charge gauge 84 may include an indicator arrangement providing information to the driver relating to the amount of charge remaining in the battery 48. Similar to the fuel level gauge 82, the indicator arrangement of the battery state of charge gauge 84 may include a battery charge level line 90 with a similar semi-transparent shaded area 92 beneath. As battery charge increases, so too may the battery charge level line 90. As the battery 48 loses charge, the battery charge level line 90 may move downward. Additional functionality of the battery state of charge gauge 84 will be described below in greater detail with respect to alternate selectable information display levels 78.

The fuel level gauge 82 may be provided on the information display 66 adjacent to the right-hand side of the speedometer 70, while the battery state of charge gauge 84 may be provided on the information display 66 immediately adjacent the left-hand side of the speedometer 70. It should be noted that the arrangement and location of the one or more visual gauges 80 within a particular selectable information display level can be varied without departing from the scope of the present application.

Each of the plurality of selectable information display levels 78 may include a minimum amount of content that may be present regardless of which selectable information display level the driver chooses. For example, each information display level may include an engine coolant temperature (ECT) gauge 94, a transmission selection (PRNDL) gauge 96, an information message center 98, and/or one or more fuel consumption readouts 100.

The ECT gauge 94 may include an indicator arrangement that can convey the relative engine coolant temperature. As the engine coolant temperature increases, an engine coolant temperature indicator line 102 likewise increases. As the engine coolant temperature decreases, so too does the engine coolant temperature indicator line 102. The ECT gauge 94 may also include an engine coolant temperature telltale 104 that may signal when the engine coolant temperature reaches a predetermined value. The predetermined value may correspond to a temperature in which it is acceptable to turn the engine 12 off. For example, it may not be desirable to turn the engine off—even though the other driving conditions do not require engine power to propel the vehicle—when the engine 12 is not sufficiently warm. In that regard, activation of the engine coolant temperature telltale 104 may inform the driver that the engine 12 is ready to shut down if current driving conditions do not require engine power. It should be noted that the predetermined value may be fixed or may vary based upon a predefined algorithm.

The PRNDL gauge 96 may include an indicator arrangement that identifies which gear the vehicle 10 is currently in. For example, when the vehicle 10 is in park, the "P" may be encircled or otherwise highlighted. The same may likewise occur for other gears. It should be noted that although the transmission selection gauge 96 is depicted as a PRNDL gauge, other drive gears are fully contemplated by the present application.

The information message center 98 may provide text corresponding to several different types of vehicle content. For example, the information message center 98 may display an overall odometer, as well as one or more trip odometers, one or more timers, and/or an average fuel economy readout that may be reset by the driver. The fuel consumption readouts 100 may provide information such as overall fuel economy in miles per gallon, the remaining number of miles until the fuel tank is empty, or the like. While the ECT gauge 94, the PRNDL gauge 96, the information message center 98, and the fuel consumption readouts 100 may be provided in various locations on the information display 66, they are generally provided in the same location within each of the plurality of selectable information display levels 78.

The information display system 64 may further include at least one display control button 106 for navigating through various display settings and selecting particular information display levels. As shown in FIGS. 2a-2d, the at least one display control button 106 comprises three display control buttons labeled INFO, SETUP, and RESET. However, it should be noted that additional or alternate display control buttons may be provided without departing from the scope of the present application. The at least one display control button 106 may be disposed on or near the instrument panel 68 as shown in FIGS. 2a-2d. Alternatively, the at least one display control button 106 may be provided elsewhere. For example, the at least one display control button 106 may be disposed on a steering column, steering wheel, control head unit, or the like (not shown). As another example, the at least one display control button 106 may be provided on the information display 66 itself in a region that is responsive to touch. Correspondingly, the controller 54 may be configured to receive an at least one driver input in response to a touch of the at least one display control button 106 in the region of the information display 66 responsive to touch. Generally, it is to be understood that the controller 54 may be configured to receive the at least one driver input corresponding to the selection of the at least one display control button 106 regardless of its location.

Figure 2B:
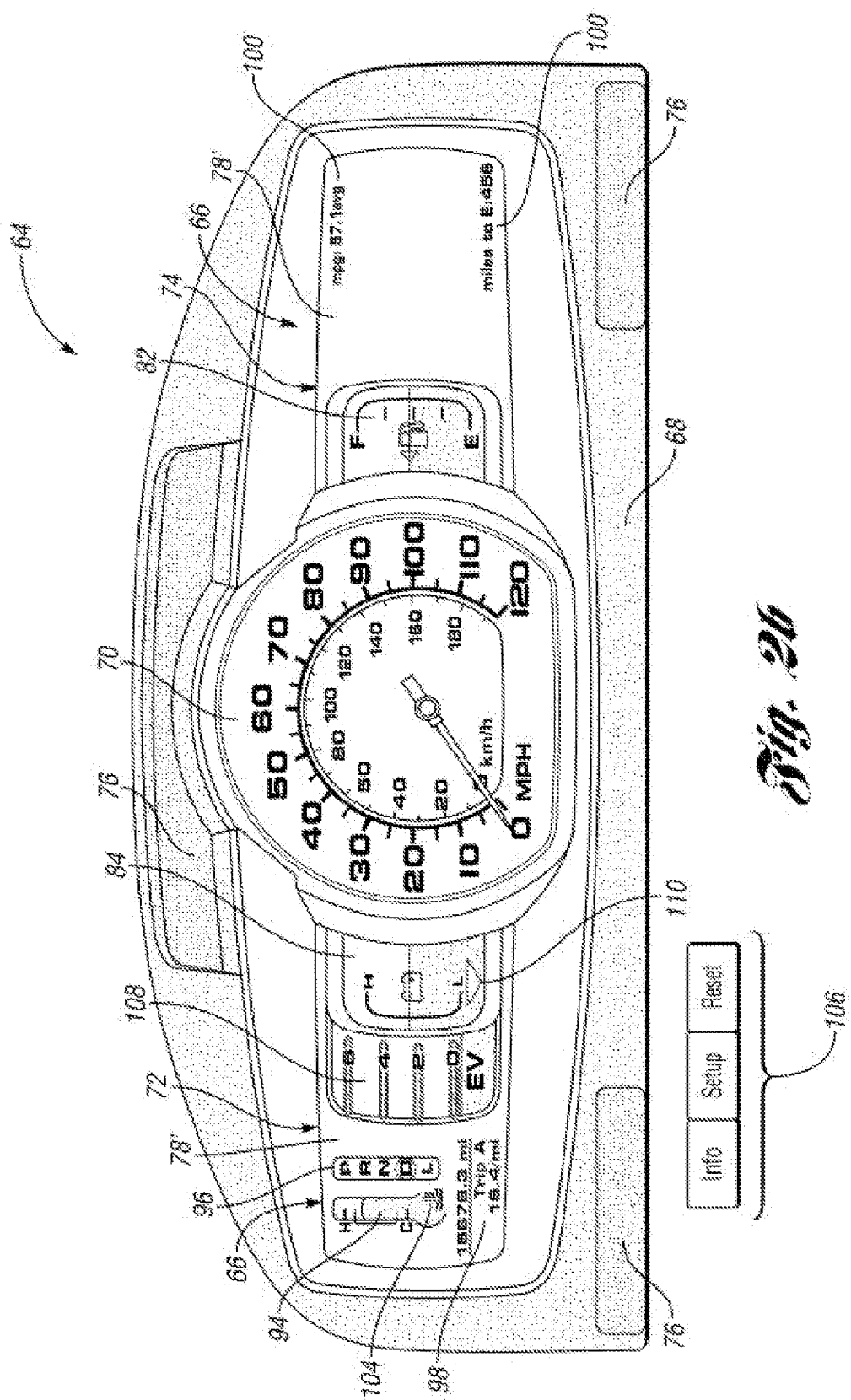
FIG. 2b is a simplified, exemplary diagram depicting the information display system displaying a second selectable information display level.

Referring now to FIG. 2*b*, the information display 66 is shown having a second selectable information display level 78' (Level 2), which may provide more vehicle content than Level 1 although Level 2 may still be relatively streamlined. As seen therein, Level 2 may still include the fuel level gauge 82 and the battery state of charge gauge 84, as well as the ECT gauge 94, PRNDL gauge 96, information message center 98 and fuel consumption readouts 100. Additionally, the second selectable information display level 78' may provide a tachometer/electric vehicle (EV) mode gauge 108 adjacent to and left of the battery state of charge gauge 84. The tachometer/EV mode gauge 108 may automatically alternate between two types of indicator arrangements depending upon operating conditions of the vehicle 10. For example, an "EV Mode" indicator arrangement conveying that the engine 12 is turned off may be displayed as shown in FIG. 2*b*. On the other hand, when the engine 12 is on, an indicator arrangement corresponding to the current engine speed may be displayed (see FIG. 3*e*).

In addition to including additional or alternative visual gauges 80 at each of the plurality of selectable information display levels 78, particular visual gauges may have a plurality of content states. For example, a visual gauge may have a first content state and a second content state, wherein the second content state includes more vehicle information than the first content state. With reference to FIG. 2*a*, for example, the battery state of charge gauge 84 may be depicted in a first content state. Referring now to FIG. 2*b*, the battery state of charge gauge 84 may be depicted in a second content state in which a direction indicator 110 is provided. The direction indicator 110 is operable to inform the driver when the battery 48 is receiving charge, depicted by an up arrow (not shown), or losing charge, depicted by a down arrow.

Thus, selecting an information display level higher up in the information display hierarchy may display not only additional visual gauges, but also one or more of the same visual gauges in a different content state. Additionally or alternatively, the driver may select between the various content states of a particular visual gauge within a particular selectable information display level. It should be noted that more than two content states may be displayed by a particular visual gauge as will be described in greater detail below with respect to the battery state of charge gauge 84.

Figure 2C:
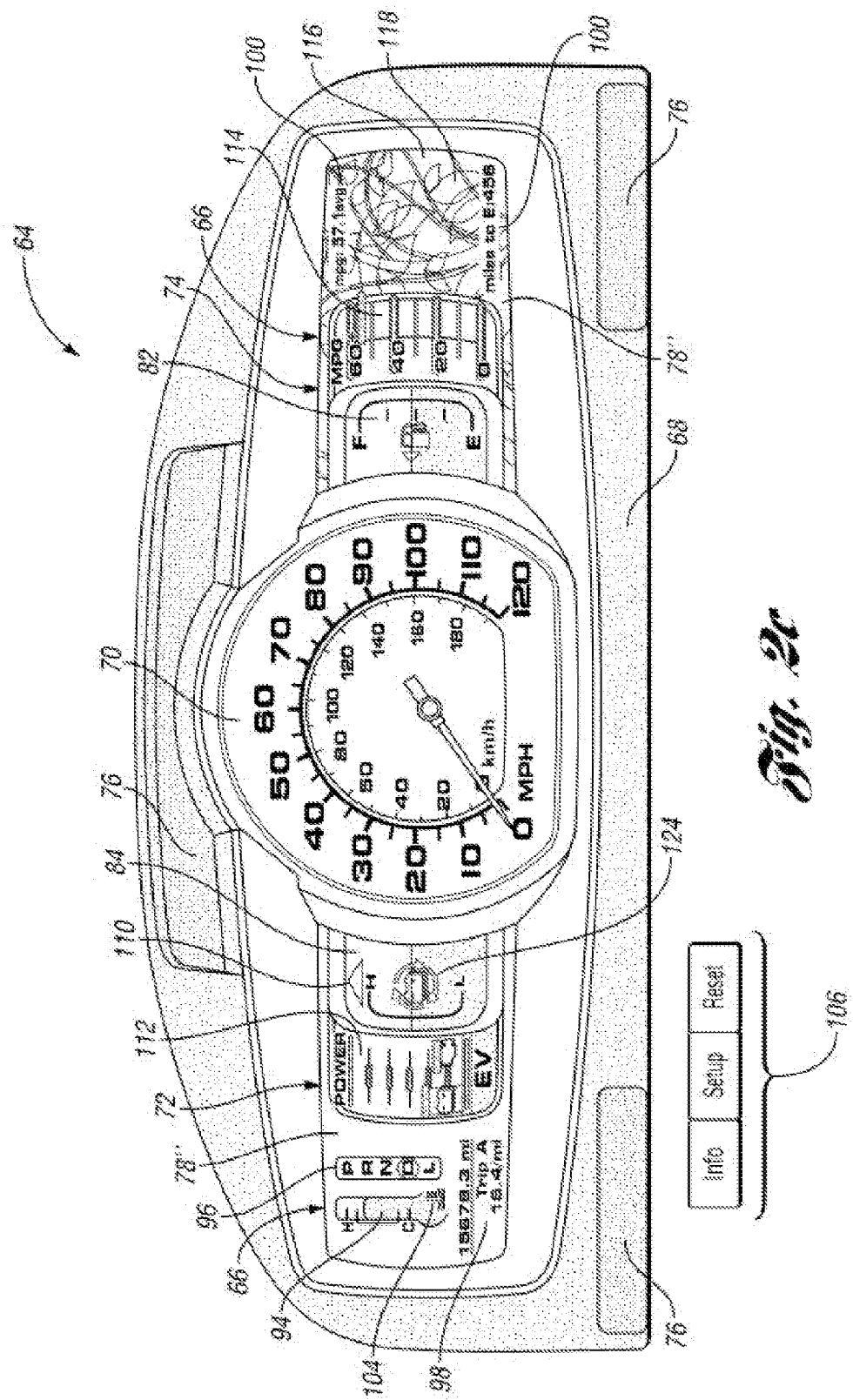
FIG. 2c is a simplified, exemplary diagram depicting the information display system displaying a third selectable information display level.

Referring now to FIG. 2*c*, the information display 66 is shown having a third selectable information display level 78" (Level 3), which may provide additional or alternative vehicle content than Level 2. Level 3 may be designed to convey vehicle content to further encourage or help the driver in more efficient driving. As seen therein, Level 3 may still include the fuel level gauge 82 and the battery state of charge gauge 84, as well as the ECT gauge 94, PRNDL gauge 96, information message center 98 and fuel consumption readouts 100. FIG. 2*c* also depicts the battery state of charge gauge 84 in yet another content state. As shown therein, the battery state of charge gauge 84 may include a regenerative braking indicator 124 that can illuminate or otherwise appear when the battery 48 is receiving charge due to a regenerative braking event.

Additionally, the third selectable information display level 78" may include a split power gauge 112 adjacent to and left of the battery state of charge gauge 84. The split power gauge 112 may include an indicator arrangement depicting the amount of power being provided by the battery 48 as well as the amount of power being supplied by the engine 12. In addition, when the vehicle 10 is operating without the engine 12 turned on, an "EV" indicator may be displayed.

Additionally or alternatively, the third selectable information display level 78" may further provide an instantaneous fuel economy gauge 114 which can be provided adjacent and to the right of the fuel level gauge 82. The instantaneous fuel economy gauge 114 can be used to inform the driver of the instantaneous fuel economy of the vehicle 10.

Further, the third selectable information display level 78" may provide an efficiency gauge 116 adjacent and to the right of the instantaneous fuel economy gauge 114. The efficiency gauge 116 may provide feedback to the driver corresponding to how efficiently the vehicle 10 is being operated over a particular range (e.g., a period of time, a number of gallons of fuel, a tank of fuel, etc.). The efficiency feedback conveyed may be associated with driving habits of the driver, as well as other factors such as weather, terrain, accessory usage, or the like. As depicted in FIG. 2*c*, the efficiency gauge provided therein includes an indicator arrangement corresponding to an "efficiency forest" having a varying number of efficiency indicators 118. As shown, the efficiency indicators 118 may be depicted as leaves, however other efficiency indicators are contemplated by the present application. To this end, the more efficiency indicators 118 displayed by the efficiency gauge 116, the more energy-efficient the vehicle 10 is being operated.

The efficiency gauge 116 may be time-dependent. In that regard, the efficiency indicators 118 displayed corresponding to the driver's driving habits may be based upon a period of time. Moreover, the period of time may be selected by the driver via the at least one display control button 106, as will be described in greater detail below.

According to an embodiment of the present application, while certain visual gauges may only be available within a particular selectable information display level within the information display hierarchy, one or more visual gauges 80 may be displayed at the driver's discretion within any of the plurality of selectable information display levels 78. For example, the instantaneous fuel economy gauge 114 illustrated in FIG. 2*c* may only be provided for the first time in the third selectable information display level 78" (Level 3), or perhaps for the first time in the second selectable information display level 78' (Level 2) (not shown). Alternatively, the driver may select the instantaneous fuel economy gauge 114 to be displayed within any of the plurality of selectable information display levels 78 via the at least one display control button 106. Likewise, the efficiency gauge 116 illustrated in FIG. 2*c* may be provided only within certain selectable information display levels 78, or may be turned on and off by the driver within each or some of the plurality of selectable information display levels 78. Moreover, within a selectable information display level, the driver may be able to select between different content states of a particular visual gauge, in addition to whether or not to display the visual gauge at all. For example, the driver may be able to choose between displaying the "efficiency forest", as depicted in FIG. 2*c*, a "fuel economy history bar graph," as depicted in FIG. 2*d* and described in greater detail below, or no efficiency gauge at all.

FIG. 2*d* will now be described in greater detail. FIG. 2*d* illustrates the information display 66 providing a fourth selectable information display level 78' (Level 4) that may be designed to convey vehicle content for optimal driving performance. As seen therein, Level 4 may still include the fuel level gauge 82 and the battery state of charge gauge 84, as well as the ECT gauge 94, PRNDL gauge 96, information message center 98 and fuel consumption readouts 100. Additionally, the fourth selectable information display level 78''' may provide even more vehicle content than the third selectable information display level 78". To this end, the fourth selectable information display level 78'" may include a vehicle power gauge 120 adjacent and to the left of the battery state of charge gauge 84. The vehicle power gauge 120 may include an indicator arrangement for providing vehicle information related to a driver demand threshold and a current driver demand, and indicate a relationship between the driver demand and an engine-on event. In addition, when the vehicle 10 is operating without the engine 12 turned on, the vehicle power gauge 120 may display an "EV" indicator. Moreover, an accessory load gauge 122 may be provided adjacent and to the left of the vehicle power gauge 120. The accessory load gauge 122 may include an indicator arrangement providing vehicle information corresponding to the current amount of power needed to run certain vehicle accessories such as the air conditioning system 62.

FIG. 2d also depicts the battery state of charge gauge 84 in still yet another content state. As shown therein, the direction indicator 110 may change color when the charge being supplied to the battery 48 is due at least in part to a regenerative braking event. Although it is contemplated that the regenerative braking indicator 124 may also be displayed in this content state, it is equally contemplated that the regenerative braking indicator 124 may be absent from this content state.

FIG. 2d also depicts the efficiency gauge 116 described in FIG. 2c. However, in the embodiment shown in FIG. 2d, the efficiency gauge 116 is represented by the aforementioned "fuel economy history bar graph." This particular content state of the efficiency gauge can provide a history of the vehicle's fuel economy in bar segments over a period of time. As previously described, the period of time may be selected by the driver through the at least one display control button 106. In the exemplary embodiment depicted in FIG. 2d, the selectable period of time may correspond to a ten-minute interval (i.e., the most recent ten minutes of driving). As shown, the fuel economy history bar graph may include ten bars. Accordingly, each bar 126 shown in FIG. 2d can represent the fuel economy attained over a one-minute period. Thus, the fuel economy history bar graph shown in FIG. 2d can convey a discrete value of the fuel economy attained in each of the last ten minutes of driving. If, however, the selectable period of time corresponds to a twenty-minute interval, then each bar 126 may indicate a discrete fuel economy value provided in two-minute segments. Similarly, if the selectable time period corresponds to a sixty-minute interval, then each bar 126 may indicate a discrete fuel economy value provided in six-minute segments. It should be understood that time periods other than ten, twenty and sixty minutes may be provided. Further, the fuel economy history bar graph may include less than or more than ten distinct bars without departing from the scope of the present application.

Therefore, with reference to FIGS. 2a-2d, collectively, an information display system including an information display is illustrated providing a plurality of selectable information display levels 78. Each successive selectable information display level may provide additional vehicle content through one or more visual gauges. When moving through the information display hierarchy from one selectable information display level to the next successive selectable information display level, the information display may provide additional or alternative visual gauges that can provide an increasing amount of vehicle content. Moreover, the one or more visual gauges may be provided in a plurality of different content states. A driver may also select between different content states within each of the plurality of selectable information display levels 78. Further, a driver may select whether or not to display a particular visual gauge within any of the plurality of selectable information display levels 78. Finally, a minimum level of vehicle content may be displayed in each of the plurality of selectable information display levels 78 (e.g., engine coolant temperature, transmission selection, fuel level, battery state of charge, etc).

Referring now to FIGS. 3a-3j, a non-exhaustive list of exemplary visual gauges 80 that may be displayed within a particular information display level is provided. It should be noted that additional or alternative visual gauges providing vehicle content to the driver is fully contemplated without departing from the scope of the present application. Referring specifically to FIG. 3a, an exemplary embodiment of the accessory load gauge 122 is depicted. The accessory load gauge 122 may include an indicator arrangement providing vehicle information corresponding to the current amount of power needed to run certain vehicle accessories such as the air conditioning system. FIG. 3b depicts an exemplary embodiment of the vehicle power gauge 120. The vehicle power gauge 120 may include an indicator arrangement for providing vehicle information related to a driver demand threshold and a current driver demand, and indicate a relationship between the driver demand and an engine-on event.

FIG. 3c depicts an exemplary embodiment of the split power gauge 112. The split power gauge 112 may include an indicator arrangement depicting the amount of power being provided by the battery 48 to propel the vehicle 10 as well as the amount of power being supplied by the engine 12 to propel the vehicle 10. In addition, when the vehicle 10 is operating without the engine 12 turned on, an "EV" indicator may be displayed. FIG. 3d depicts an exemplary embodiment of the tachometer/EV mode gauge 108 showing that the engine 12 is turned off. FIG. 3e depicts an exemplary embodiment of the tachometer/EV mode gauge 108 showing that the engine 12 is turned on. As described above, the visual gauges represented in FIGS. 3d and 3e may comprise the same visual gauge that can alternate from one indicator arrangement to another depending upon whether the engine 12 is on (tachometer) or off (EV mode).

FIGS. 3f and 3g depict exemplary embodiments of the battery state of charge gauge 84 in different content states. In one content state the regenerative braking indicator 124 may illuminate upon a regenerative braking event, for example, as shown in FIG. 3g. FIG. 3h depicts an exemplary embodiment of the fuel level gauge 82. The fuel level gauge 82 may include an indicator arrangement for informing the driver of the amount of fuel remaining in a fuel tank. FIG. 3i depicts an exemplary embodiment of the instantaneous fuel economy gauge 114. The instantaneous fuel economy gauge 114 can be used to inform the driver of the instantaneous fuel economy of the vehicle 10. FIG. 3j depicts an exemplary embodiment of the efficiency gauge 116 according to an embodiment of the present application. In the example shown in FIG. 3j, the "fuel economy history bar graph" is illustrated. Of course, as described above, the efficiency gauge 116 of FIG. 3j may include one or more selectable content states including, for example, the "efficiency forest" in addition to the fuel economy history bar graph.

Figure 4A:
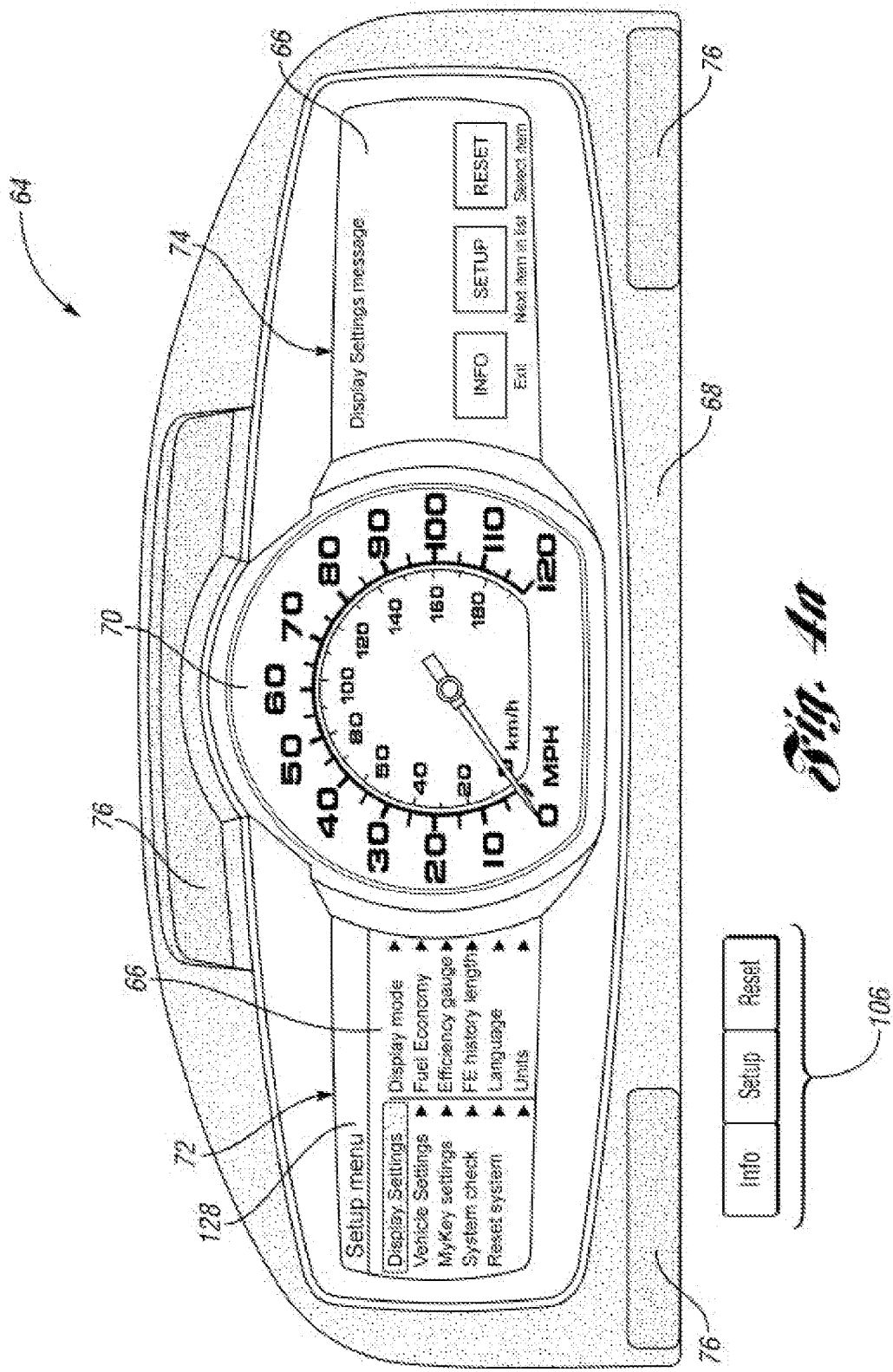
FIG. 4a is a simplified, exemplary diagram depicting the information display system displaying a setup menu according to an embodiment of the present application.

Referring now to FIG. 4a, the information display 66 is shown providing a setup menu 128 for configuring a variety of information display settings. The setup menu 128 may be accessed by the driver through the at least one display control button 106. As seen therein, the left portion 72 of the information display 66 may provide a list of display setting options including, but not necessarily limited to, display mode, fuel economy, efficiency gauge, fuel economy history length, language, and units. The right portion 74 of the information display 66 may provide such things as instructions, definitions, and/or explanations corresponding to the various options provided by the setup menu 128. Accordingly, the right portion 74 of the information display 66 can provide contextual help to the driver. The controller 54 may be configured to dynamically display select help content corresponding to the various options or menus provided by the left portion 72 of the information display 66 and in response to driver input received via the at least one display control button 106.

As an example, selection of the display mode may provide a list of the plurality of selectable information display levels 78 that may be selected by the driver according to the driver's preferences as they relate to the amount and content of the vehicle information the driver desires to be displayed. Further details regarding the display mode will be provided below in greater detail with respect to FIG. 4*b*. The fuel economy option can, for example, provide the driver an opportunity to select whether or not to display the instantaneous fuel economy gauge 114 within each of the plurality of selectable information display levels 78.

The efficiency gauge option can provide the driver the opportunity to select between whether or not to display, for example, the efficiency gauge 116 displaying the efficiency forest, the fuel economy history bar graph, or no efficiency gauge at all, within each of the plurality of selectable information display levels 78. The fuel economy history length option can provide the driver the opportunity to select a desired time interval in which the vehicle content conveyed by the efficiency gauge corresponds. For example, a driver may choose the efficiency gauge 116 to display vehicle efficiency content relating to the driver's driving habits over the last 10 minutes, 20 minutes, or 60 minutes, etc. The language option can provide the driver a choice of language for various display text (e.g., English, Spanish, French, etc.). Similarly, the units option can provide the driver a choice between displaying English units or metric units.

Through the setup menu 128, a driver or other user may access a tutorial (not shown). The tutorial may provide a self-paced guide that offers a brief overview of the information display system features. The user may select a desired information display level and then step through each visual gauge for details on the content and appearance of each visual gauge under different operating conditions. Additionally or alternatively, a demonstration mode may be accessed from the setup menu 128. The demonstration mode may briefly present each of the plurality of selectable information display levels. Each selectable information display level may be displayed for a brief period of time to demonstrate the visual organization of the content in that level.

Referring now to FIG. 4*b*, the information display 66 is shown having a display settings menu 130 with the display mode option expanded. Selecting the display mode may provide a list of the plurality of selectable information display levels 78. As seen therein, display levels 1-4 corresponding to FIGS. 2*a*-2*d*, respectively, are shown. From the display settings menu 130, a driver may select the information display level that best suits the driver's preferences. As previously described, each successive selectable information display level can provide an additional or increasing level of vehicle content corresponding to the information display hierarchy. Accordingly, as a driver learns more about the vehicle and how it operates, the driver may choose to move to a higher level that provides additional vehicle content or feedback to the driver to help the driver alter driving habits for increased fuel economy. Of course, even though a particular driver may be savvy to the expansive content of the vehicle information available, the driver may not prefer much of that content to be displayed. Therefore, the driver may select a particular information display level corresponding to the driver's particular tastes.

Figure 5:
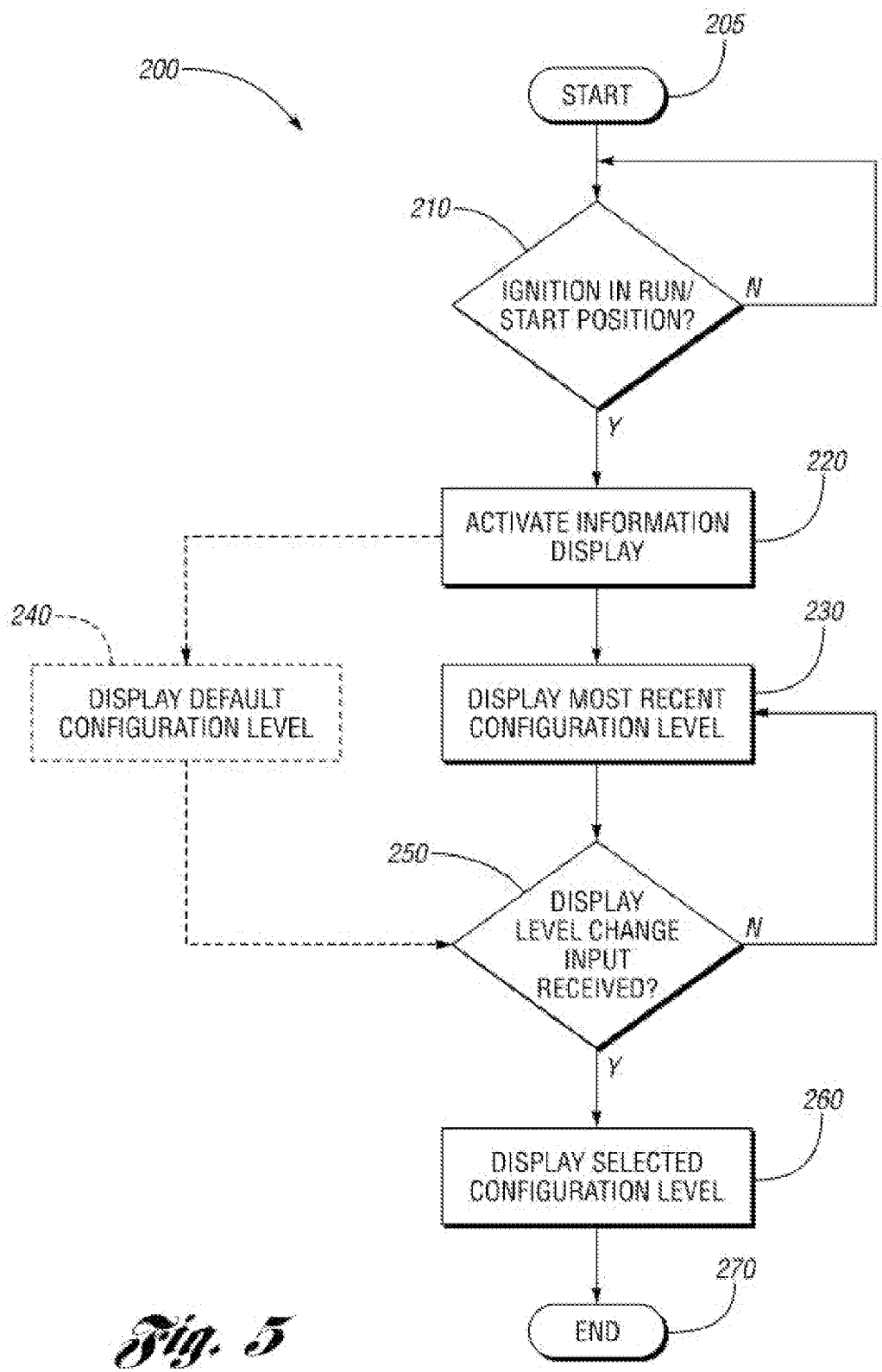
FIG. 5 is a simplified, exemplary flowchart depicting a methodology according to an embodiment of the present application.

Referring now to FIG. 5, a simple, exemplary flow chart depicting a method 200 for displaying particular selectable information display levels is shown. Step 205 may provide an entry to the method. As seen therein, at step 210, the controller 54 may determine whether a vehicle ignition switch (not shown) is in the run/start position. If it is determined that the ignition switch is not in the run/start position, step 210 may be repeated. If, however, it is determined that the ignition switch is in the run/start position, the method proceeds to step 220. At step 220, the controller 54 may cause the information display 66 to be activated. To this end, the information display 66 turns on so that the vehicle content may be displayed.

It is contemplated that when the information display 66 initially turns on, a trip summary screen may be displayed. The trip summary screen may display select vehicle content from the most recent ignition cycle (i.e., the driver's last drive or "trip"). For example, the trip summary screen may display such prior trip information as distance traveled, fuel economy, fuel used, and trip efficiency. The trip efficiency can include a display of the efficiency gauge 116 conveying how efficiently the vehicle was operated during the previous ignition cycle. The trip efficiency may be displayed using the "efficiency forest," as previously described. Further, a long-term fuel economy may also be displayed with the trip summary screen, showing the vehicle's fuel economy since the last driver reset.

The trip summary screen may be displayed briefly when the ignition is cycled on to remind the driver of the fuel economy and energy efficiency attained during the most recent trip. To this end, the trip summary screen may likewise be briefly displayed when the ignition switch is cycled off thereby providing the driver immediate feedback regarding how efficient and economical the vehicle was operating over the course of the trip that was just completed.

Referring back to FIG. 5, at step 230, the information display 66 may display the most recent selectable information display level. In that regard, the selectable information display level that was active prior to when the ignition switch was last in the run/start position may be the selectable information display level displayed.

Alternatively, once the information display 66 is activated, a default information display level may be displayed as depicted by step 240. In that regard, if for example the first selectable information display level 78 (Level 1) is the default information display level, then Level 1 may be the selectable information display level that is displayed each time the ignition switch is turned to the run/start position. In yet another alternative embodiment, the information display system 64 may be configured to provide multiple user profiles, each of which may recall settings or preferences for one or more drivers of the vehicle 10. Further, the vehicle 10 may be able to identify the one or more drivers upon entry of the vehicle or an ignition switch event. In that regard, the most recent selectable information display level displayed for a particular driver may correspond to the selectable information display level that was active the last time that particular driver operated the vehicle 10.

Next, at step 250, the controller 54 may determine whether an information display level change input has been received. For example, the controller 54 may determine whether a driver input has been received from the at least one display control button 106 corresponding to one of the plurality of selectable information display levels 78. If the controller 54 determines that an information display level change input has not been received, the method returns to step 230 in which the information display 66 displays the most recent selectable information display level. If, however, the controller 54 determines that an information display level change input has been received, the controller 54 may transmit a signal to the information display 66 instructing the information display 66 to display the selected information display level at step 260. The action may then end at step 270.

Figure 6:
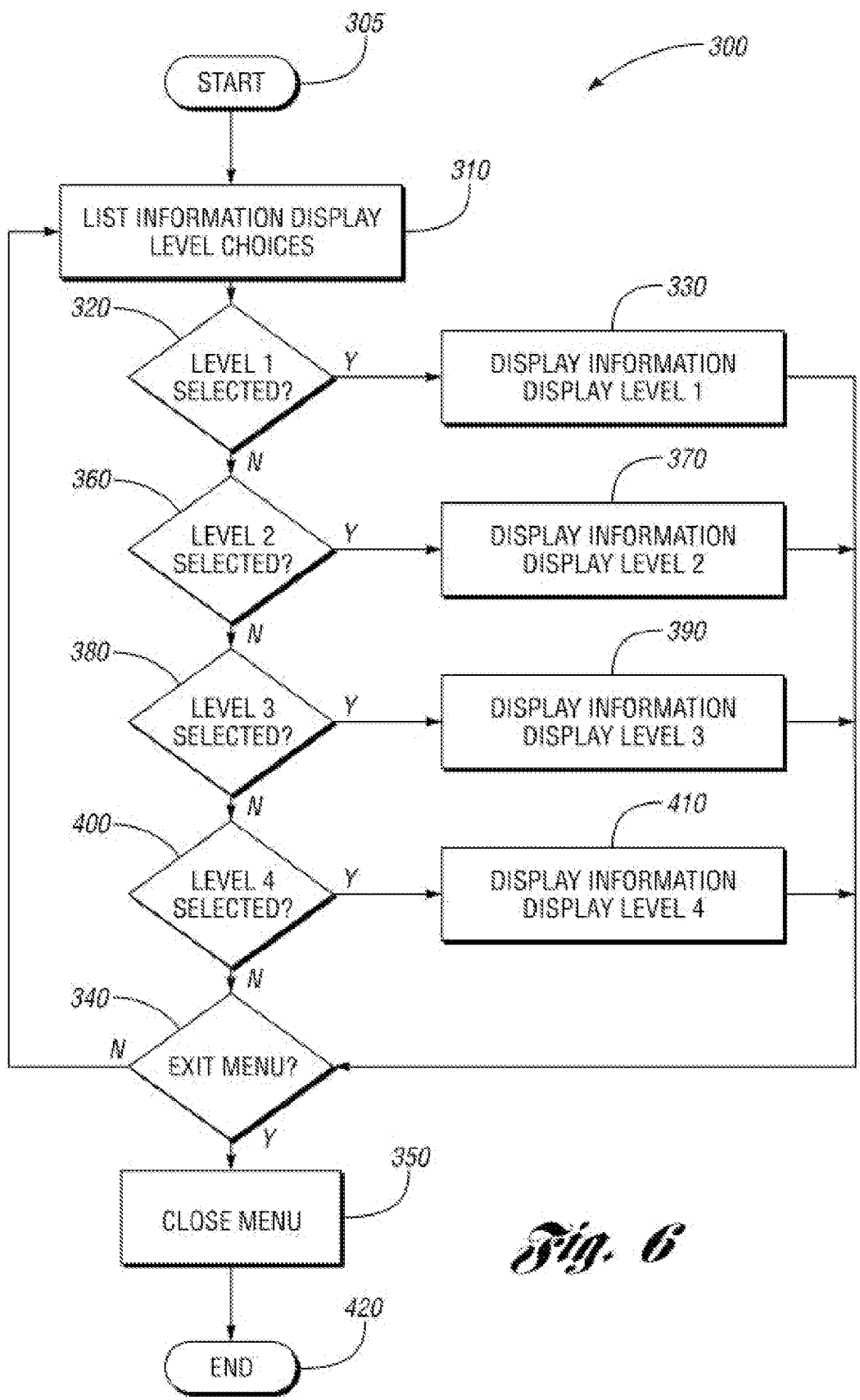
FIG. 6 is a simplified, exemplary flowchart depicting an alternate methodology according to an embodiment of the present application.

Referring now to FIG. 6, a slightly more detailed, exemplary flowchart depicting a methodology 300 for displaying particular selectable information display levels is shown. Step 305 may provide an entry to the method. As seen therein, the controller 54 may instruct the information display 66 to display a list of the plurality of selectable information display levels 78 at step 310. The list of selectable information display levels may correspond to the display settings menu 130 under the display mode option as illustrated in FIG. 4b. Accordingly, the list of selectable information display levels may be displayed in response to driver input via the at least one display control button 106.

Next, at step 320, the controller 54 may determine whether the first selectable information display level 78 corresponding to Level 1 has been selected via driver input received from the at least one display control button 106. If it is determined that Level 1 has been selected, the controller 54 may send a signal to the information display 66 instructing the information display 66 to display the first selectable information display level 78 as provided at step 330. The method may then proceed to step 340 in which the controller 54 may determine whether a driver input has been received requesting that the display settings menu 130 be exited. If it is determined that a request to exit the display settings menu 130 has been received, the menu may be deactivated or otherwise closed and the selected information display level is displayed at step 350. If, however, it is determined that a request to exit the display settings menu 130 has not been received, then the method returns to step 310, wherein the list of selectable information display level choices is provided.

Returning to step 320, if it is determined that Level 1 has not been selected, the controller 54 may then determine whether the second selectable information display level 78' corresponding to Level 2 has been selected at step 360. If Level 2 has been selected, then the controller 54 may transmit a signal to the information display 66 to display the second selectable information display level 78' at step 370. The controller 54 may then determine whether a request to exit the display settings menu 130 has been received at step 340. If it is determined that a request to exit the display settings menu 130 has been received, then the display settings menu 130 may be closed (step 350). If, however, it is determined that a request to exit the display settings menu 130 has not been received, then the method may return to step 310 where the list of selectable information display level choices is provided.

Returning to step 360, if the controller 54 determines that Level 2 has not been selected, the controller 54 may next determine whether the third selectable information display level 78" corresponding to Level 3 has been selected at step 380. If the controller 54 determines that Level 3 has been selected, then the controller 54 may transmit a signal to the information display 66 to display the third selectable information display level 78" at step 390. Again, the controller 54 may then determine whether a request to exit the display settings menu 130 has been received at step 340. If it is determined that a request to exit the display settings menu 130 has been received, then the display settings menu 130 may be closed (step 350). If, however, it is determined that a request to exit the display settings menu 130 has not been received, then the method may return to step 310, wherein the list of selectable information display level choices is provided.

Returning to step 380, if the controller 54 determines that Level 3 has not been selected, the controller 54 may next determine whether the fourth selectable information display level 78''' corresponding to Level 4 has been selected at step 400. If it is determined that Level 4 has been selected, the controller 54 may send a signal to the information display 66 instructing the information display 66 to display the fourth selectable information display level 78''' at step 410. Then, the controller 54 may determine whether a request to exit the display settings menu 130 has been received at step 340. If it is determined that a request to exit the display settings menu 130 has been received, then the display settings menu 130 may be closed at step 350 and the selected information display level is displayed. If, however, it is determined that a request to exit the display settings menu 130 has not been received, then the method may return to step 310, wherein the list of selectable information display level choices is provided.

Returning to step 400, if the controller 54 determines that Level 4 has not been selected, the controller 54 may then determine whether a request to exit the display settings menu 130 has been received at step 340. If it is determined that a request to exit the display settings menu 130 has not been received, then the method may return to step 310, wherein the list of selectable information display level choices is provided. If, however, it is determined that a request to exit the display settings menu 130 has been received, then the controller 54 may instruct the information display 66 to close the display settings menu 130 and display the selected information display level at step 350. The action may then end at step 420.

Thus, the methodology 300 provided in FIG. 6 presents an exemplary embodiment in which the plurality of selectable information display levels 78 may be selected and displayed through a display settings menu 130 accessible by driver input through the at least one display control button 106. The at least one display control button 106 may be employed to allow the driver to navigate through one or more menus displayed by the information display 66 and send signals to the controller 54 corresponding to one or more driver inputs. The controller 54 may be further configured to transmit signals so that the information display 66 displays vehicle content or menus corresponding to the received driver input. To this end, a driver may navigate through the information display hierarchy provided to select a desired information display level to be displayed.

Figure 7:
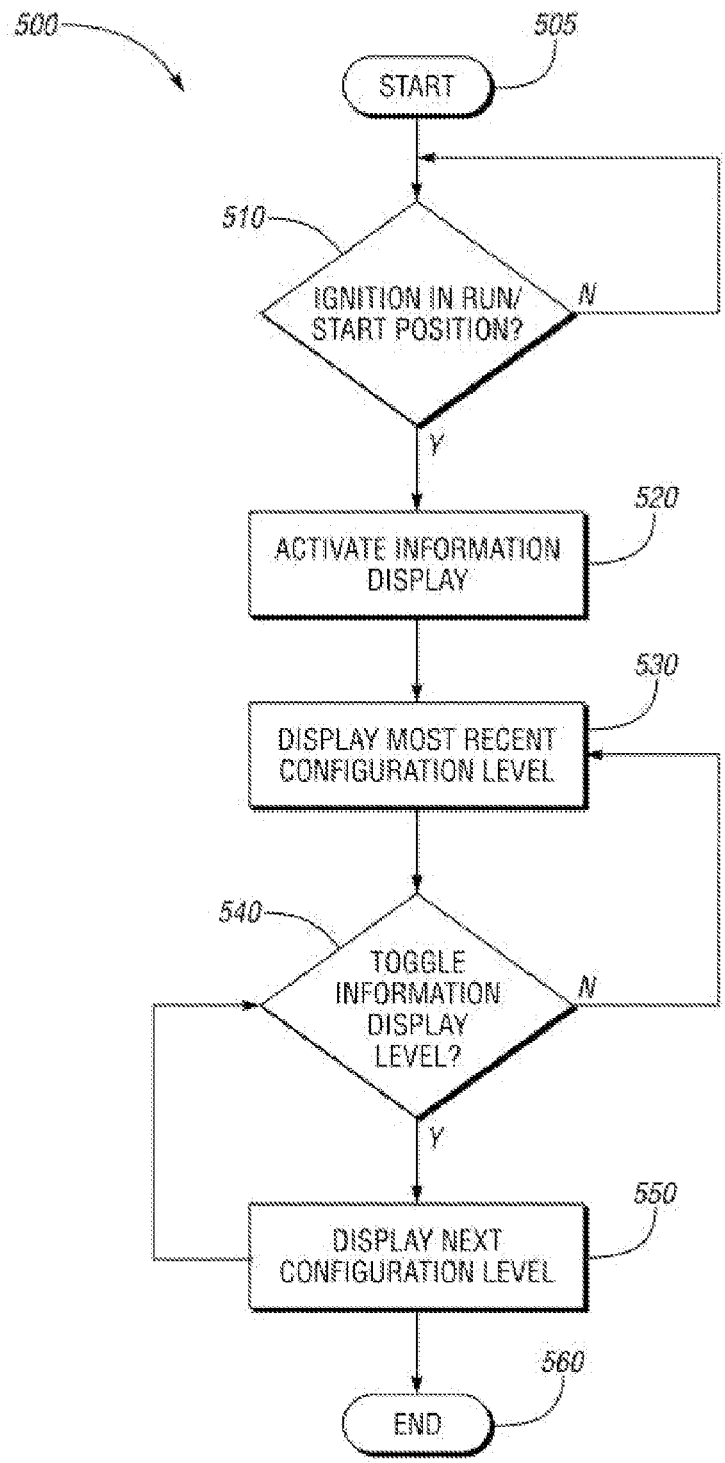
FIG. 7 is a simplified, exemplary flowchart depicting yet another alternate methodology according to an embodiment of the present application.

Referring now to FIG. 7, a simplified, exemplary flowchart depicting an alternate methodology 500 for displaying particular selectable information display levels is shown. Flowchart 500 may provide a methodology for selecting a particular information display level by toggling through the plurality of selectable information display levels 78 according to the information display hierarchy via the at least one display control button 106. Step 505 may provide an entry to the method. As seen therein, at step 510, the controller 54 may determine whether the vehicle ignition switch is in the run/start position. If the controller 54 determines that the ignition switch is not in the run/start position, step 510 may be repeated. If, however, the controller 54 determines that the ignition switch is in the run/start position, a step 520 may be performed in which the information display 66 is activated.

Next, the information display 66 may display the most recent selectable information display level corresponding to the last ignition off command at step 530. Thereafter, the controller 54 may determine whether a selectable information display level change input has been received at step 540. In that regard, a driver may toggle between the plurality of selectable information display levels 78 via the at least one display control button 106. Accordingly, a driver input may be received at the controller 54 corresponding to the toggling operation. If it is determined that an information display level change input has not been received, then the method may return to step 530, wherein the most recent selectable information display level continues to be displayed. If, however, it is determined that a selectable information display level change input has been received corresponding to the toggling of the at least one display control button 106, then the next successive selectable information display level may be displayed at step 550. The action may then return to step 540, wherein the controller 54 can determine whether another information display level change input has been received. The action may otherwise end at step 560.

Accordingly, a driver may select a particular information display level to be displayed by repeatedly pressing the at least one display control button 106 configured to toggle through the information display hierarchy. The driver may stop toggling the at least one display control button 106 once the desired selectable information display level is displayed. Thus, methodology 500 can provide the driver the ability to select a particular information display level without navigating through one or more setup menus. A similar methodology (not shown) may be employed allowing the driver to toggle between whether or not select visual gauges are to be displayed within a particular selectable information display level. Likewise, a similar methodology may be employed allowing the driver to choose between a plurality of different content states of particular visual gauges within a particular selectable information display level.

It should be noted that the methods of FIGS. 5-7 as described herein are exemplary only, and that the functions or steps of the methods could be undertaken other than in the order described and/or simultaneously as may be desired, permitted and/or possible. It should also be noted that the various embodiments provided herein are generally described with reference to a hybrid electric vehicle. However, it is to be understood that the information display system and methods contained herein may be equally applicable to other types of vehicles.

While the best mode for carrying out the invention has been described in detail, those familiar with the art to which this invention relates will recognize various alternative designs and embodiments for practicing the invention as defined by the following claims.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. A vehicle display method comprising:
receiving driver input corresponding to a selected content level of vehicle information associated with one of a plurality of selectable information display levels; and
displaying the vehicle information associated with one of the plurality of selectable information display levels corresponding to the selected content level, the plurality of selectable information display levels including at least a first selectable information display level and a second selectable information display level, the first selectable information display level and the second selectable information display level including at least one visual gauge having at least a first content level state and a second content level state, the second content level state including additional vehicle content associated with the at least one visual gauge than the first content level state, wherein the first selectable information display level is associated with the at least one visual gauge in the first content level state and the second selectable information display level is associated with the at least one visual gauge in the second content level state.

2. The method of claim 1, wherein the first selectable information display level includes at least a first visual gauge and the second selectable information display level includes the first visual gauge and at least a second visual gauge.

3. The method of claim 2, wherein the first visual gauge is the at least one visual gauge having at least the first content level state and the second content level state.

4. The method of claim 2, wherein each selectable information display level displays includes at least battery state of charge gauge.

5. The method of claim 4, further comprising:
displaying the battery state of charge gauge in a first content level state when the selected content level corresponds to the first selectable information display level, wherein the first content level state includes at least a battery state of charge indicator.

6. The method of claim 4, further comprising:
displaying the battery state of charge gauge in a second content level state when the selected content level corresponds to the second selectable information display level, wherein the second content level state includes at least a battery state of charge indicator and a regenerative braking indicator.

7. The method of claim 4, further comprising:
displaying the battery state of charge gauge in a second content level state when the selected content level corresponds to the second selectable information display level, wherein the second content level state includes at least a battery state of charge indicator and a charging direction indicator.

8. The method of claim 2, wherein each selectable information display level includes at least a fuel level gauge.

9. The method of claim 8, wherein the fuel level gauge includes a fuel level line and an area below the fuel level line that changes colors when the fuel level line reaches a predetermined value.

10. The method of claim 2, wherein each selectable information display level includes at least an engine coolant temperature (ECT) gauge, the engine coolant temperature gauge including an engine coolant temperature telltale that illuminates when the engine coolant temperature reaches a predetermined value.

11. The method of claim 1, wherein receiving driver input corresponding to a selected content level of vehicle information comprises:
receiving driver input corresponding to a request to display a display settings menu, the display settings menu including an information display hierarchy listing the plurality of selectable information display levels arranged by degree of vehicle content associated with each selectable information display level;
displaying the display settings menu; and receiving driver input corresponding to a selection of one of the plurality of selectable information display levels from the information display hierarchy.

12. An information display for displaying vehicle information associated with one of a plurality of selectable information display levels, the information display comprising:
a first display portion on one side of a speedometer; and
a second display portion on an opposite side of the speedometer;
wherein the first and second display portions display at least a first visual gauge upon selection of a first selectable information display level, and the first and second display portions display the first visual gauge and at least a second visual gauge upon selection of a second selectable information display level.

13. The information display of claim 12, wherein each selectable information display level includes at least a fuel level gauge.

14. The information display of claim 12, wherein at least the first visual gauge has a first content level state and a second content level state, the second content level state including additional vehicle content associated with the first visual gauge than the first content level state.

15. The information display of claim 14, wherein the first content level state is associated with the first selectable information display level and the second content level state is associated with the second selectable information display level.

16. The information display of claim 15, wherein the first visual gauge is a battery state of charge gauge, the first content level state including at least a battery state of charge indicator, the second content level state including at least the battery state of charge indicator and a regenerative braking indicator.

17. A vehicle display comprising:
a first selectable information display level including at least one visual gauge displayed in a first content level state; and
a second selectable information display level including the at least one visual gauge displayed in a second content level state, the second content level state including additional vehicle content associated with the at least one visual gauge than the first content level state.

18. The vehicle display of claim 17, wherein the first selectable information display level includes at least a first visual gauge and the second selectable information display level includes the first visual gauge and at least a second visual gauge.

19. The vehicle display of claim 18, wherein the first visual gauge is the at least one visual gauge displayed in the first content level state or the second content level state.

20. The vehicle display of claim 17, wherein the at least one gauge is a battery state of charge gauge, the first content level state including at least a battery state of charge indicator, the second content level state including at least the battery state of charge indicator and a regenerative braking indicator.

* * * * *